United States Patent [19]

Yamashita et al.

[11] Patent Number: 5,610,900
[45] Date of Patent: Mar. 11, 1997

[54] CENTERING DEVICE OF AN OPTICAL DISC PLAYER

[75] Inventors: Masakazu Yamashita; Shigeharu Furusawa; Masao Abe; Tomohiro Mizuno; Hidekatsu Miyasaka, all of Saitama-ken, Japan

[73] Assignee: Pioneer Electronic Corporation, Tokyo, Japan

[21] Appl. No.: 445,134

[22] Filed: May 19, 1995

[30] Foreign Application Priority Data

May 19, 1994 [JP] Japan .................................. 6-129727

[51] Int. Cl.$^6$ .................................................. G11B 17/028
[52] U.S. Cl. ........................ 369/271; 369/282; 360/99.12
[58] Field of Search ................................. 369/271, 270, 369/282; 360/98.08, 99.05, 99.12

[56] References Cited

U.S. PATENT DOCUMENTS

| | | | |
|---|---|---|---|
| 4,541,086 | 9/1985 | Tanaka | 369/271 |
| 4,575,837 | 3/1986 | Okita | 369/270 |
| 4,747,002 | 5/1988 | Takikawa et al. | 360/99.05 |
| 4,958,839 | 9/1990 | Guzik et al. | 360/99.12 |
| 5,208,798 | 5/1993 | Funabashi et al. | 369/270 |
| 5,303,098 | 4/1994 | Yamamori et al. | 360/99.12 |

FOREIGN PATENT DOCUMENTS

| | | | |
|---|---|---|---|
| 58-179972 | 10/1983 | Japan | 369/270 |
| 58-194181 | 11/1983 | Japan | 369/270 |
| 2-128356 | 5/1990 | Japan | 369/270 |

*Primary Examiner*—Stuart S. Levy
*Assistant Examiner*—William R. Korzuch
*Attorney, Agent, or Firm*—Nikaido, Marmelstein, Murray & Oram LLP

[57] ABSTRACT

An upper clamping device and a lower clamping device are provided for clamping a double-sided optical disc in cooperation with the upper clamping device. An annular holder is axially movably provided in the upper clamping device. A plurality of spheres are radially movably mounted on the holder. A hub having a slant at a periphery thereof is axially movably provided. When the hub is downwardly moved the slant urges the spheres to engage them with an inside wall of a center hole of the optical disc. Thus, the optical disc is centered.

7 Claims, 8 Drawing Sheets

CENTERING DEVICE OF AN OPTICAL DISC PLAYER

BACKGROUND OF THE INVENTION

The present invention relates to a centering device provided in an optical disc player for centering an optical disc, and more particularly to a centering device for a double-sided optical disc.

There is a certain type of optical disc which comprises two discs adhered to each other at the back thereof so that the thus assembled disc has a double recording surface, namely side A and side B. Once the assembled disc is set on a turntable of a disc player, the double side can be continuously played so that the user need not bother to flip over the disc.

However, when adhering the two discs, center holes thereof may not always accurately coincide with each other. In order to correct the deviation of the assembled disc on the turntable, a centering device is provided. The centering device has a pair of centering mechanisms, each for one of the sides A and B, and one of the mechanisms is selectively operated depending on the side to be played.

Referring to FIG. 10, a conventional centering device for centering a double-sided disc 50 comprising a lower side A disc 50a and an upper side B disc 50b is housed in a holder 31. The centering device comprises a lower portion for centering the side A disc 50a and an upper portion for centering the side B disc 50b.

The lower portion of the centering device has a hollow turntable 20 on which the disc 50 is set. The turntable 20 is fixedly mounted on a spindle shaft 21. A centering hub 22 with which the hole of the side A disc 51a engages is vertically slidably mounted on the spindle shaft 21 inside the turntable 20. A spring 23 is provided between the bottom surface of the turntable 20 and the lower end of the centering hub 22, thereby urging the centering hub 22 upward. A stopper 24 is provided on the spindle shaft 21 so as to restrict the sliding movement of the center hub 22.

The upper portion of the centering device has a clamper 30 which cooperates with the turntable 20 to clasp the disc 50 therebetween. A shaft 32 is vertically slidably mounted in the holder 31. An upper end portion of the shaft 32 projects out of the holder 31 so as to be actuated by a changeover arm 35 driven by a driving means (not shown). On the other end of the shaft 32 is fixed a centering hub 33 which is adapted to engage with the center hole of the side B disc 50b. A spring 34 having a smaller force than the spring 23 is provided between the clamper 30 and the centering hub 33, thereby urging the centering hub 33 downward.

When playing the side A disc 50a, the changeover arm 35 is disengaged from the disc as shown in FIG. 10. When the disc 50 is clamped on the turntable 20 by the clamper 30, the centering hubs 22 and 33 are pushed toward each other by the springs 23 and 34, respectively. Since the spring 23 has a larger force than the spring 34, the centering hub 22 pushes the centering hub 33, and fits in the center hole of the side A disc 50a. Thus the disc 50 is so positioned that the disc 50a is centered. Hence the side A of the disc 50 can be played.

When playing the side B of the disc 50, the changeover arm 35 is operated to push down the shaft 32, thereby pushing down the centering hub 33 as shown in FIG. 11. The centering hub 33 accordingly forces the centering hub 22 downward against the urging of the spring 23 so that the hub 22 is disengaged from the hole of the disc 50a. As the shaft 32 is further depressed, the centering hub 33 engages with the center hole of the disc 50b. As a result, the disc 50b is accurately positioned, enabling to play the side B of the disc 50.

The conventional centering device thus requires not only two centering hubs for the two recorded surfaces, but also a changeover means for selecting one of the centering hubs, such as the changeover arm in the above described example, so that the construction thereof is complicated. In addition, the disc can be played only after the hub is selected, thereby taking time to start playing.

SUMMARY OF THE INVENTION

An object of the present invention is to provide a centering device of a disc player for a double-sided optical disc wherein each side of the disc can be easily centered with a simple mechanism.

According to the present invention, there is provided a centering device of an optical disc player having an upper clamping device provided on a clamper holder, a lower clamping device for clamping a double-sided optical disc in cooperation with the upper clamping device, a spindle shaft provided in a center of the lower clamping device, and a turntable secured to the spindle shaft.

The centering device comprises an annular holder axially movably provided in the upper clamping device, and having a diameter smaller than a center hole of the optical disc, a plurality of centering members radially movably mounted on the holder, driving means provided in the upper clamping device for axially moving the holder, centering means for outwardly moving the centering members to engage the centering members with an inside wall of the center hole of the optical disc mounted on the turntable, at a central position with respect to the thickness of the optical disc when the holder is downwardly moved by the driving means for clamping the optical disc, whereby the optical disc is centered.

The centering means comprises a hub axially movably provided in the upper clamping device and a slant formed on a periphery of the hub so as to push the centering members.

The driving means comprises a rotary disc plate rotatably provided in the clamper holder, a plurality of springs provided between the rotary disc plate and the holder for downwardly urging the holder.

The other objects and features of this invention will become understood from the following description with reference to the accompanying drawings.

BRIEF DESCRIPTION OF DRAWINGS

FIG. 6a is a diagram showing center holes of a double-sided optical disc for explaining the principle of the present invention;

FIG. 6b is a sectional diagram of the double-sided disc of FIG. 6a;

DETAILED DESCRIPTION OF THE PREFERRED EMBODIMENTS

Figure 2:
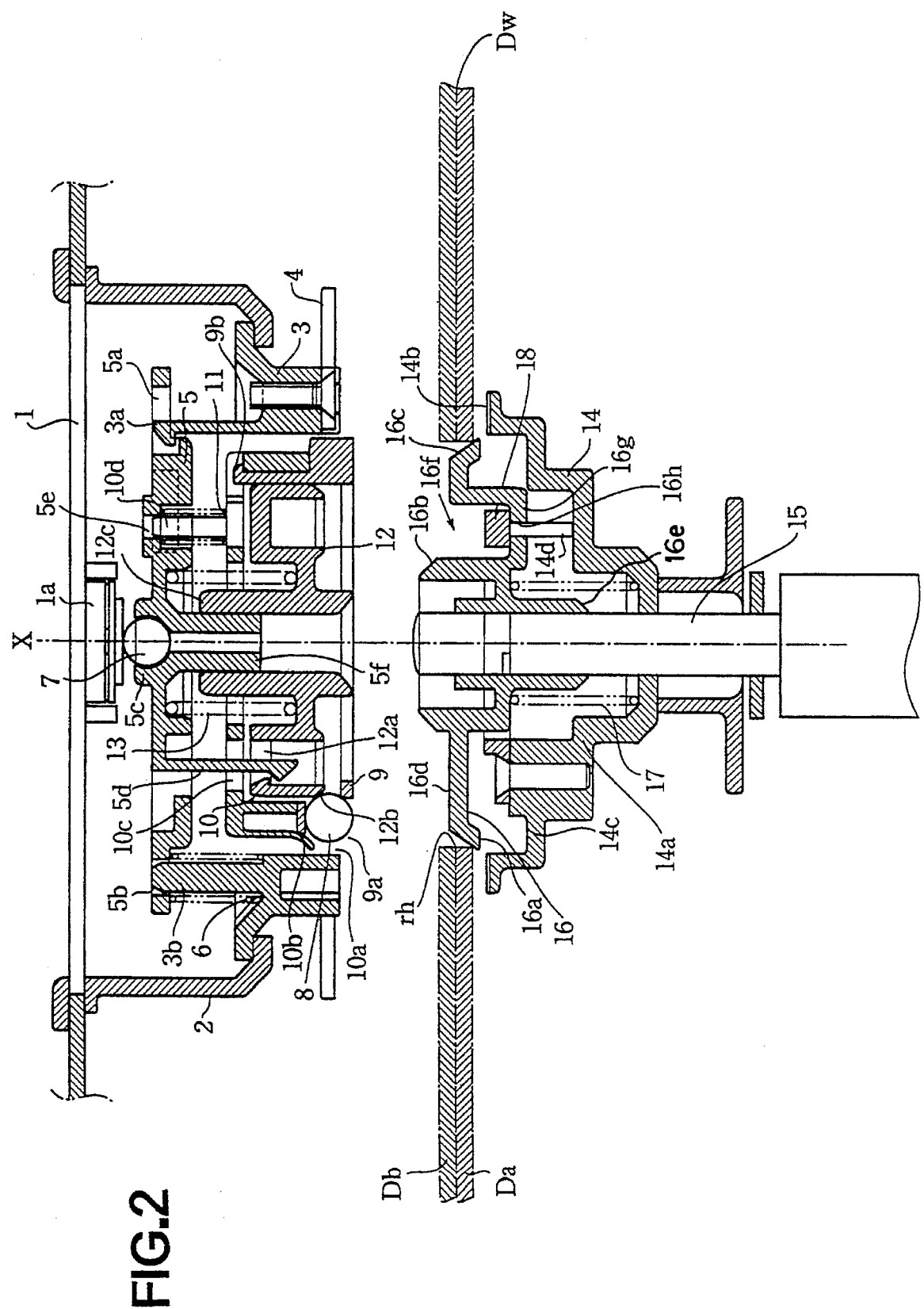
FIG. 2 is a sectional view of the centering device of FIG. 1.

Referring to FIG. 2, a centering device of an optical disc player of the present invention comprises a lower clamping device on which an optical disc is set, and an upper clamping device for holding the disc, in cooperation with the lower clamping device.

Figure 1:
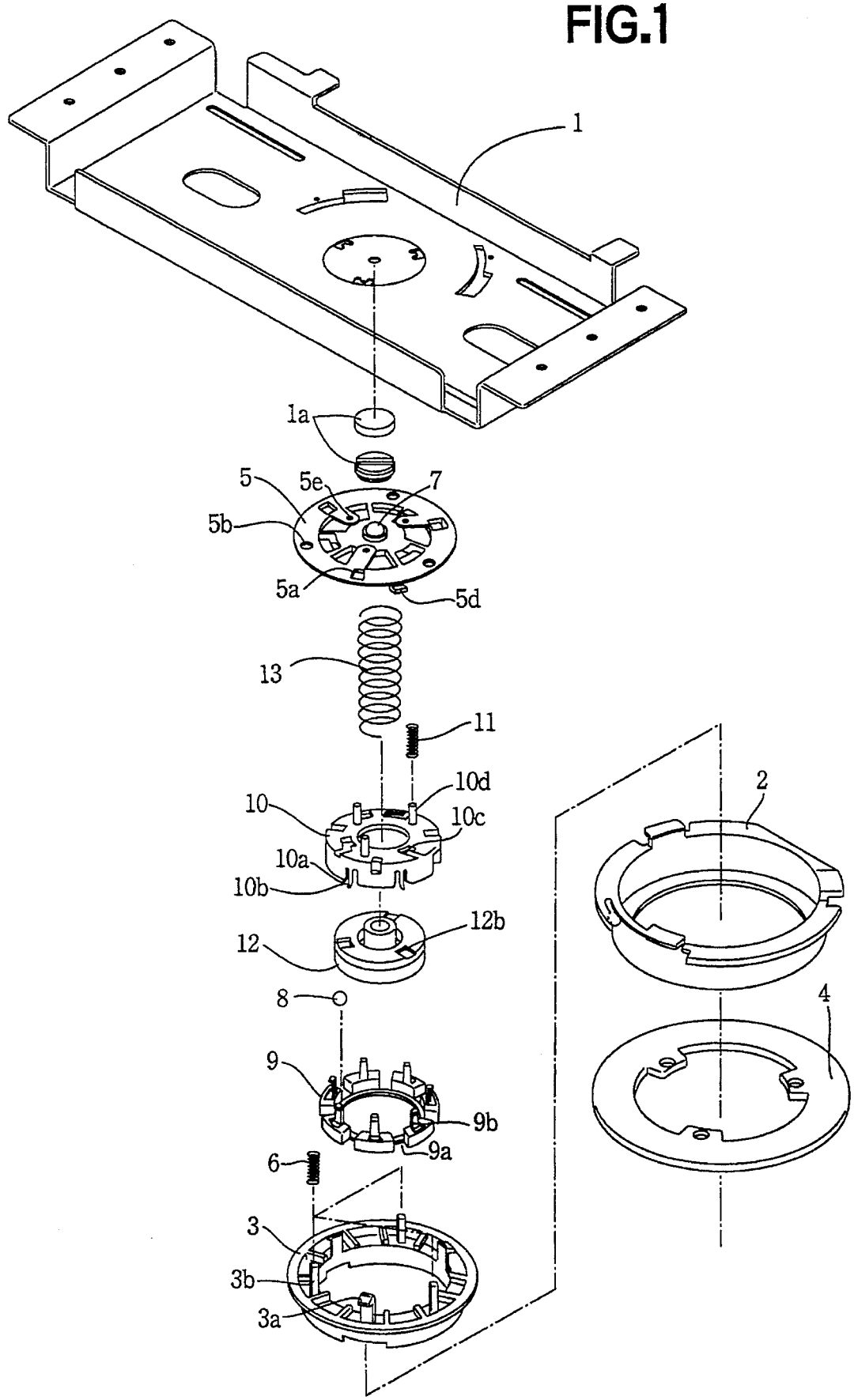
FIG. 1 is a an exploded perspective view showing a part of a centering device of an optical disc player according to the present invention.

Referring to FIGS. 1 and 2, the upper clamping device comprises a supporting plate 1 which is vertically moved by a driving mechanism (not shown), and a clamper holder 2 fixed to the underside of the plate 1. A lower edge of the clamper holder 2 engages with a peripheral flange portion of an annular clamper 3, thereby rotatably supporting the clamper 3. The clamper 3 is provided to cooperate with the lower disc supporting portion so as to clamp the optical disc set in the disc player. As shown in FIG. 1, the clamper 3 has a plurality of equidistantly spaced lugs 3a, in the present embodiment, three lugs, each projecting upward from the inner peripheral portion of the clamper 3. A plurality of pins 3b are formed equidistantly between the lugs 3a.

As shown in FIG. 2, an annular stabilizer 4 is secured to the bottom of the clamper 3 by screws for restraining the vibration of the clamped disc. Namely, the stabilizer 4 abuts on a portion of the disc where the clamper 3 does not make a contact. Hence, although the disc may be distorted, flattening of the disc during the rotation thereof is restrained.

A rotary disc plate 5 is securely fixed on the clamper 3 so as to rotate together therewith. More particularly, as shown in FIG. 1, the rotary plate 5 has three equidistantly spaced engaging holes 5a along the upper outer peripheral portion thereof, and three holes 5b formed between the engaging holes 5a. The three lugs 3a of the clamper 3 engage with the engaging holes 5a, while the pins 3b are inserted in the holes 5b. A coil spring 6 is provided between the rotary plate 5 and the clamper 3, surrounding each pin 3b, to urge the clamp 3 downwardly, thereby imparting clamping force for holding the disc to the clamper 3. The lugs 3a are provided to restrict the resilience of the spring 6, thereby preventing the spring 6 from excessively expanding in the axial direction of the pins 3b.

The rotary plate 5 further has a center projection 5f, extending downward, a ball receiving pit 5c formed on the upper surface of the center projection 5f, three equidistantly spaced downwardly extending lugs 5d, and three equidistantly spaced holes 5e formed at the inner side of the holes 5a. A ball 7 rotatably rests on the receiving pit 5c so that when the ball 7 abuts on a bearing 1a provided on the underside of the clamper supporting plate 1, a rotational axis x of the plate 5 is determined. The clamper 3, stabilizer 4, and the rotary plate 5 serve to hold the disc from above.

The upper clamping device further has an annular ball holder 9 having a diameter smaller than a diameter of an optical disc to be clamped, and having a plurality of recesses 9a, in the present embodiment, seven recesses, on the periphery of the holder 9, and a plurality of upper extending lugs 9b. Each recess 9a is adapted to hold a ball 8 which is a member for centering a disc, and is so designed that while the width of the recess in the circumferential direction of the ball holder 9 is slightly larger than the diameter of the ball 8, the width at the bottom of the holder 9 is slightly smaller. That is, the ball 8 does not fall out of the recess 9a although a part thereof extrudes from the bottom surface of the holder 9.

The ball holder 9 is covered by and fixed to a cover 10 by way of the lugs 9b. The cover 10 has seven slits 10a on the side periphery thereof, each corresponding to the recess 9a of the ball holder 9. The width of the slit 10a is slightly smaller than the diameter of the ball 8 so that only a part of the ball 8 is allowed to extrude out of the slit 10a, thereby restricting the movement of the ball 8 in the radial direction with respect to the holder 9. A leaf spring 10b is provided in each slit 10a for returning the extruded ball 8 to the original position.

Further formed on the cover 10 is three holes 10c and three upwardly extending pins 10d. Each pin 10d engages with the hole 5e of the rotary plate 5, and a coil spring 11 is provided around the pin between the plate 5 and the cover 10. The operation of the coil spring 11 will be later described. The ball holder 9 and the cover 10 are thus attached to the rotary plate 5.

Furthermore, a vertically, movable hub 12 is provided inside the cover 10 and the ball holder 9. The hub 12 has a center hub portion 12c in which the center projection 5f of the rotary plate 5 is inserted. A coil spring 13 is provided between the plate 5 and the hub 12. Three equidistantly spaced holes 12a are formed in the hub 12, each of which engaging with the lug 5d of the rotary plate 5 which extends downward penetrating through the hole 10b of the cover 10. Hence each of the rotary plate 5, cover 10 and the hub 12 is able to slide in the direction of the rotary axis x, thereby allowing changing the relative distances between one another.

The lower peripheral edge of the hub 12 is cut away toward the rotational axis x at the lower end to form a slant 12b. In operation, the slant 12b abuts against the surfaces of the balls 8, thereby pushing the balls 8 radially outward along the recess 9a of the holder 9. The coil spring 13 provided between the rotary plate 5 and the hub 12 operates to force the ball 8 in the downward direction.

Referring to FIG. 2, the lower clamping device of the centering device comprises a turntable 14, which, in cooperation with the clamper 3, stabilizer 4 and the rotary plate 5, clamps a disc. The turntable 14 is fixedly mounted on a spindle shaft 15 driven by a spindle motor (not shown). The turntable 14 has a hollow body 14a and a flange portion 14b formed around the upper periphery of the body 14a for supporting a set disc. The body 14a has an annular groove 14c adjacent to the flange portion 14b.

A center member 16 is axially slidably mounted on the spindle shaft 15 in the body 14a of the turntable 14. A coil spring 17 is provided between the center member 16 and the turntable 14, thereby urging the center member 16 in the upward direction. The center member 16 has an inner hub portion 16e engaged with the spindle shaft, an outer hub portion 16f for positioning a compact disc, and a flange 16d on which the balls 8 rest. The upper edge of the outer hub portion 16f is chamfered to form a slant 16b. The outer periphery of the flange 16d is bent to form a slant 16c having a bottom edge 16a. The slant 16c is for positioning a double-sided disc before clamping and centering operation. Three recesses 16g are formed in the flange 16d, each 120 degrees apart. A stopper 18 is engaged with a pin 14d projected from the turntable 14, passing through a hole 16h to prevent the center member 16 from slipping off of the spindle shaft 15.

The vertical movement of the center member 16 is restricted by the bottom of the groove 14c of the turntable 14. That is to say, the center member 16 is at its downmost position when the bottom edge 16a thereof abuts on the bottom of the groove 14c.

The operation of the centering device for centering a double-sided disc Dw is described hereinafter with reference to FIGS. 2 and 3. The disc Dw comprises a side A disc Da and a side B disc Db adhered to each other and has a center hole rh.

Referring to FIG. 2, the disc Dw is set on the turntable 14 by a disc loading mechanism (not shown). The slant 16c of the center member 16 abuts against the inside wall of the center hole rh of the disc Dw, so that the disc Dw is preliminarily positioned. The clamper supporting plate 1 is lowered by a driving means (not shown), so that the entire upper clamping device is lowered. As a result, the clamper 3 and the stabilizer 4 abut against the disc Dw, starting the clamping operation of the disc. At the same time, the ball holder 9 and the cover 10 are inserted in the center hole rh, so that the ball holder 9 and the balls 8 are on the flange 16d of the center member 16.

Figure 3:
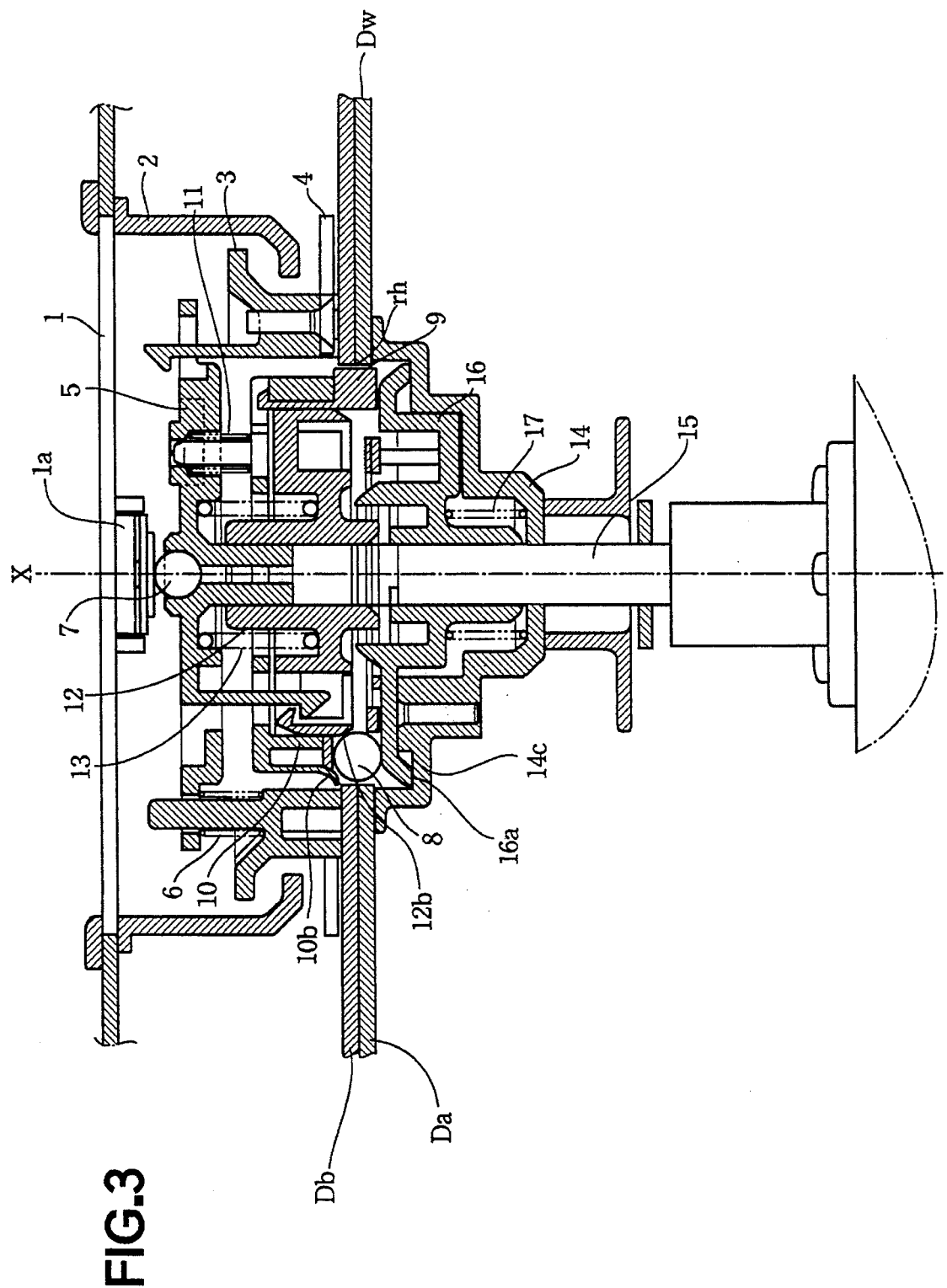
FIG. 3 is a sectional view of the centering device during a centering operation of a double-sided optical disc.

The clamper supporting plate 1 is further lowered as shown in FIG. 3, releasing the engagement between the clamper 3 and the clamper holder 2, and engagement between the clamper 3 and the rotary plate 5. The supporting plate 1 pushes down the rotary plate 5 through the bearing 1a and the ball 7. The coil spring 6 is accordingly compressed, thereby imparting a clamping force to the clamper 3.

The rotary plate 5 further urges the ball holder 9 and the hub 12 downward, which in turn pushes the center member 16 downward against the urging of the spring 17 until the edge 16a of the slant 16c abuts against the bottom of the groove 14c of the turntable 14. As a result, the balls 8 are positioned at the center with respect to the thickness of the disc Dw, that is, in the axial direction of the rotary axis x. Namely, the thickness of the center member 16 is so dimensioned as to position the balls 8 in alignment with the boundary between the discs Da and Db when the edge 16a of the center member 16 abuts against the bottom of the groove 14c.

At the same time, the coil spring 13 urges the hub 12 downwardly so that the slant 12b of the hub 12 radially outwardly pushes each ball 8. Thus, a part of the ball 8 is exposed from the slit 10a. The balls 8 thus push the periphery of the hole rh and renders the disc Dw to slide. As a result, the disc Dw is centered. While the ball 8 is pushed outward, yielding the leaf spring 10b, the resilience of the spring 10b causes the ball 8 to be pushed back toward the spindle shaft 15 when the disc is released.

The principle of the centering operation is described hereinafter in detail with reference to FIGS. 6a and 6b.

The side A disc Da and the side B disc Db constructing the double-sided disc Dw have a center hole Dha and a center hole Dhb, respectively. Each of the center holes has exactly the same dimension. The deviation of the holes from one another occurs when the discs Da and Db are inaccurately adhered to the other. More particularly, since the diameter of the center hole of each disc is the same, the deviations thereof are symmetrical with respect to the center line of the center hole rh of the disc Dw as shown in FIG. 6a. That is to say, the distance between a center point Xw of the hole rh of the disc Dw and a center point Xa of the center hole Dha of the disc Da, and the distance between the center point Xw and a center point Xb of the center hole Dh are equal. The principle of the present invention is based on the fact that the deviation of the center holes is caused not by the difference in the size of the holes of the two discs, but by the deviation between the discs.

Figure 6:
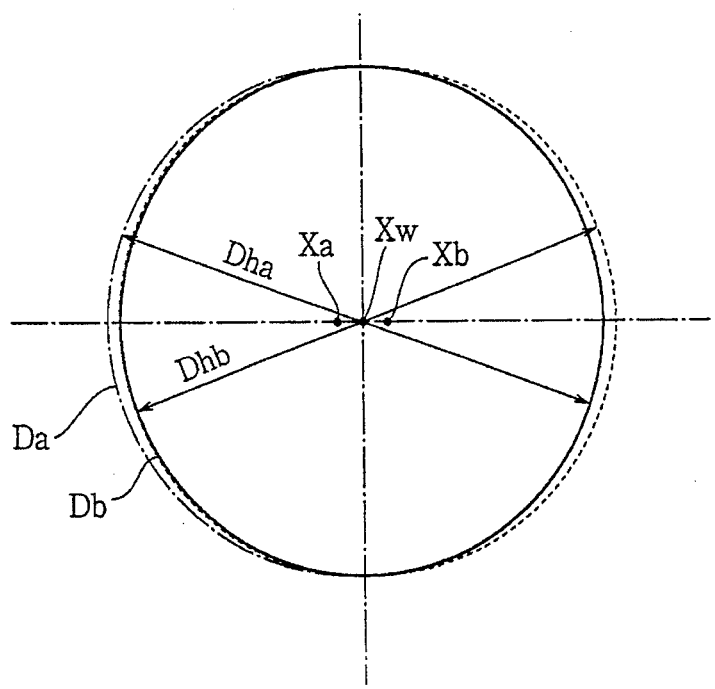
Figure 6:
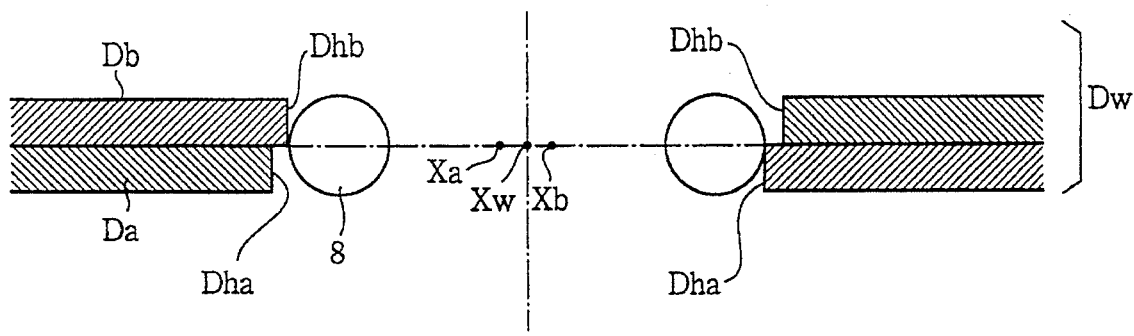

Referring to FIG. 6b, when the balls are positioned at the center with respect to the thickness of the assembled disc Dw, the balls 8 abut only against the wall of one of the inner holes. For example, as shown in FIG. 6b, if one of the balls 8 is in contact with the inner wall Dhb of the disc Db, another ball 8 positioned 180 degrees apart from the first ball 8 abuts against the wall of the other hole Dha of the disc Da. Hence the center point Xw which is at the intermediate position between the center points Xa and Xb, falls on the axis x of rotation of the disc Dw. Thus, the disc Dw is so positioned that the center points Xa and Xb are both close enough to the axis x to be able to play both sides A and B.

Figure 4:
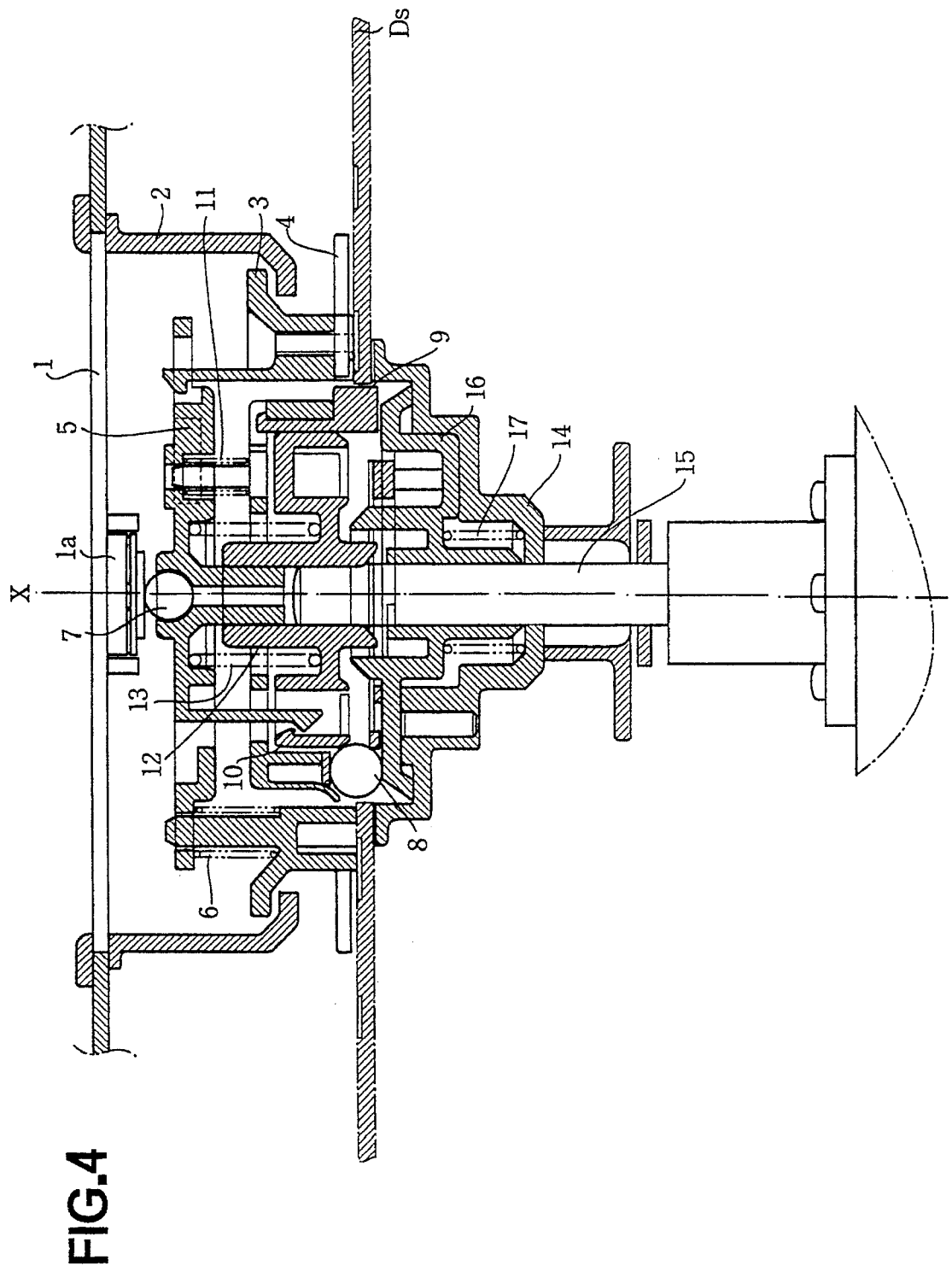
FIG. 4 is a sectional view of the centering device during a centering operation of a single-sided optical disc.

Referring to FIG. 4, the centering device of the present invention may also be used for accurately positioning a single-sided optical disc Ds. The balls 8 are positioned at a height slightly higher than the center line with respect to the thickness of the disc Ds.

Figure 5:
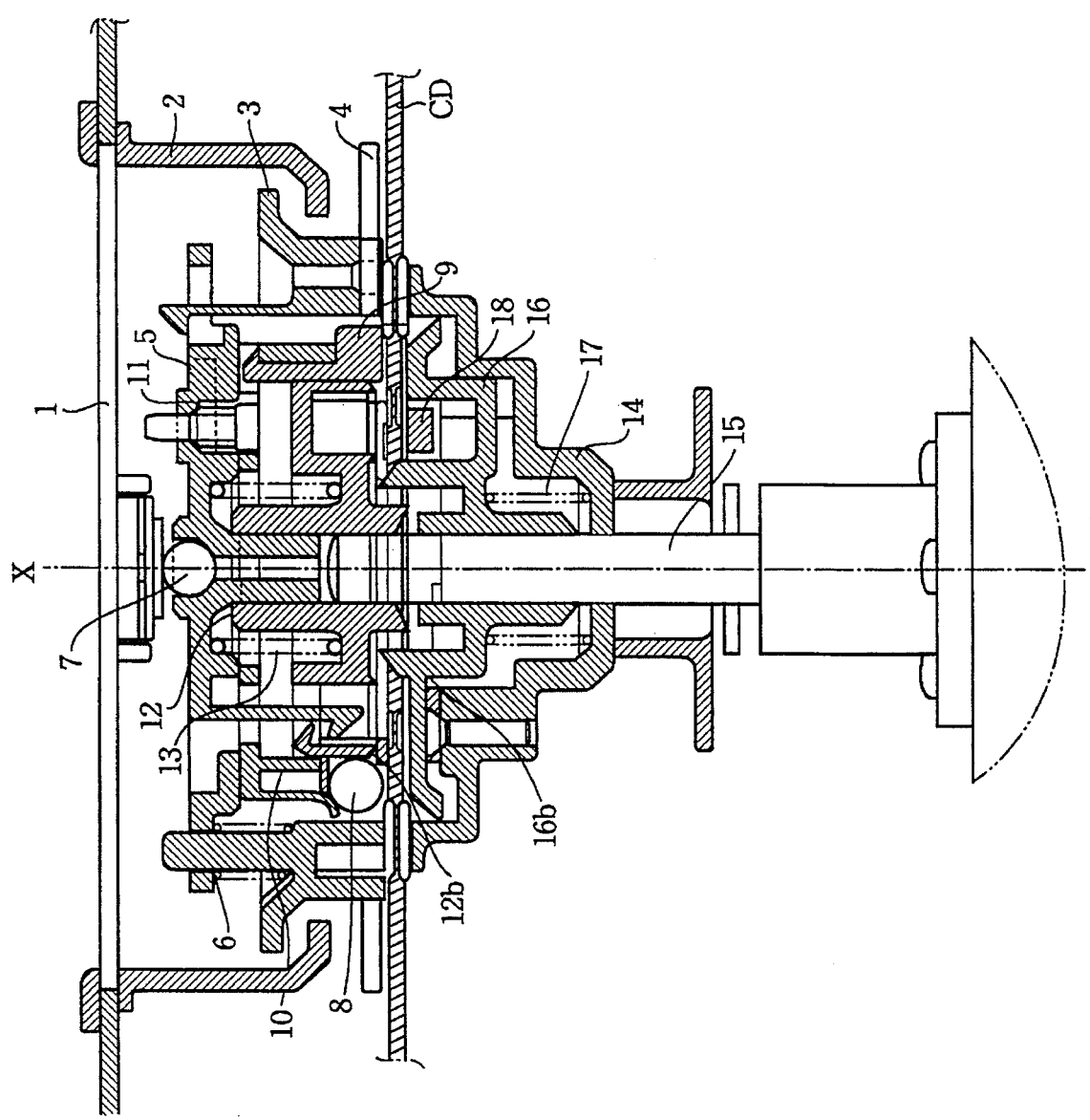
FIG. 5 is a sectional view of the centering device during a centering operation of a compact disc, having a small center hole.

Referring to FIG. 5, a compact disc CD having a smaller center hole than the discs Dw and Ds may further be positioned and clamped with the centering device of the present invention. The center hole of the disc CD is engaged with the outer hub portion 16f of the center member 16, abutting the slant 16b thereof against the wall of the center hole. When the rotary plate 5 is downwardly pushed, the ball 8 are urged by the slant 12b of the hub 12 so that each of the balls is pushed out of the slit 10a. However, since the balls 8 do not engage with the center hole of the disc CD, a counter force of the spring 13 is not generated. Hence the hub 12 can be completely lowered into the ball holder 9 and the cover 10. The balls 8 are hence pushed by a part of the hub 12 other than the slant 12b, that is the side periphery of the hub, so that the hub may get stuck, unable to return upward to its original position. However, upon release of the disc CD, the coil spring 11 urges the cover 10 in a downward direction, thereby releasing the engagement between the hub 12 and the cover 10. Hence the hub 12 is released and returns to its original position.

Figure 8:
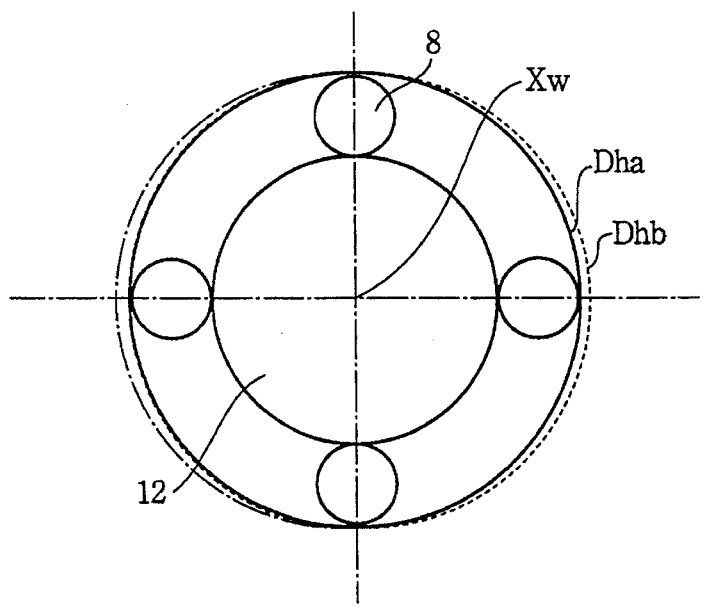
FIG. 8 is a diagram showing the centering device wherein an even number of centering members are provided.

The above described centering operation of the discs can be carried out if more than two balls 8 are provided as the centering members. However, when more than three balls are used, it is preferable to provide balls 8 in an odd number than in an even number. More particularly, as shown in FIG. 8, when an even number of balls 8 are provided, at least two of them are disposed symmetrical with respect to the center point Xw of the disc Dw at 180 degrees apart from each other. When the positions of such symmetrically disposed balls coincides with the position where the deviation between the center holes Dha and Dhb is the largest as shown in the figure, the other balls 8 cannot abut against the wall of the holes with a sufficient force. Thus the disc Dw cannot be stably clamped.

Figure 9:
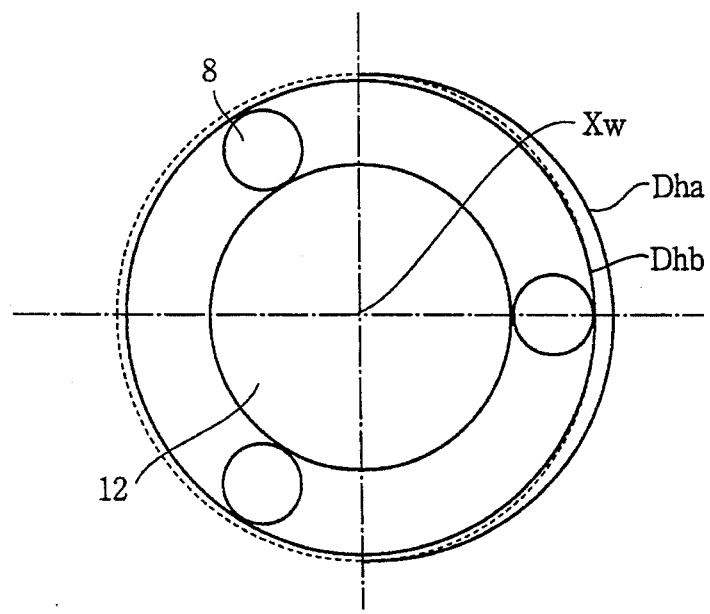
FIG. 9 is a diagram showing the centering device wherein an odd number of centering members are provided.
Figure 10:
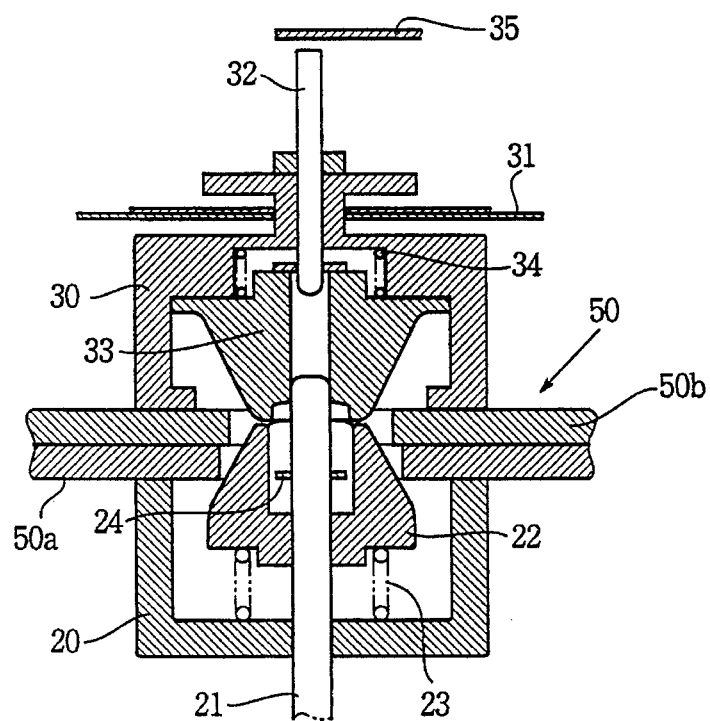
FIG. 10 is a sectional view of a conventional centering device for a double-sided optical disc.
Figure 11:
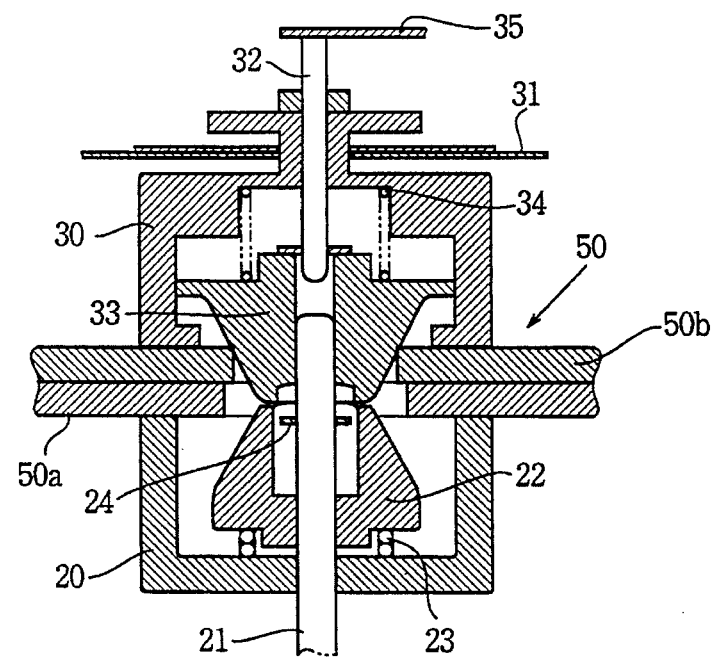
FIG. 11 is a sectional view of the centering device of FIG. 10 in operation.

On the other hand, as shown in FIG. 9, when an odd number of balls 8 are provided, each ball 8 abuts against the wall of the center holes with sufficient force. As a result, the disc can be accurately centered.

Figure 7:
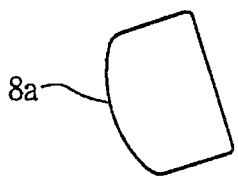
FIG. 7 is an illustration showing an example of a centering member provided in the centering device of the present invention.

The centering members need not be confined to the balls 8. As shown in FIG. 7, a centering member 8a may take any shape as long as a portion of the surface which abuts against the wall of the center holes has a curve symmetrical in the direction of the thickness of the disc.

Whereas the conventional centering device for a double-sided optical disc required two centering mechanisms and a selecting means thereof, the disc can be centered with a single device in the present invention. Centering members provided in the centering device for centering the disc can be positioned with respect to the thickness of the disc with a simple construction. Moreover, the centering operation is carried out as the disc is clamped in the playing position so that the disc can be played as soon as it is set. A positioning means of the centering members also functions to perform a preliminary positioning of the disc prior to the clamping thereof, so that the overall construction of the centering device is simplified. Since the centering members are made of inexpensive material such as balls, the centering device is manufactured at a low cost. When the centering members are provided in an odd number larger than three, a stable centering is assured.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A centering device of a disc player having upper clamping device provided on an annular clamper holder, a lower clamping device for clamping a double-sided disc in cooperation with the upper clamping device, a spindle shaft provided in a center of the lower clamping device, and a turntable secured to the spindle shaft for mounting the disc thereon so as to rotate the disc, said device comprising:

an annular holder axially movably provided in the upper clamping device, and having a diameter smaller than a center hole of the disc;

a plurality of centering members radially movably mounted on the annular holder;

resilient means for preventing the centering members from moving outwardly;

a hub axially movably provided inside the annular holder having pushing means for outwardly pushing the centering members;

driving means provided in the upper clamping device for downwardly moving the hub;

supporting means for supporting the centering members when the hub is downwardly moved: and the supporting means being arranged such that centering members pushed by the pushing means causes the centering members to engage with an inside wall of the center hole of the disc mounted on the turntable at a substantially central position with respect to the thickness of the double-sided disc when the hub is downwardly moved by the driving means for clamping the disc, whereby the disc is centered.

2. The centering device according to claim 1 further comprising restricting means for restricting the movement of the annular holder.

3. The centering device according to claim 2 wherein the restricting means is provided in the lower clamping device for stopping movement of the annular holder.

4. The centering device according to claim 1 wherein the pushing means of the hub is a slant formed on a periphery of the hub so as to push the centering members.

5. The centering device according to claim 4 further comprising a spring disposed between a rotary plate of the driving means and a cover of the annular member for urging the annular member toward said disc.

6. The centering device according to claim 1 wherein said driving means comprises a rotary disc plate rotatably provided in the clamper holder and a spring provided between the rotary disc plate and the hub for urging the hub toward said disc.

7. A centering device as recited in claim 1, wherein said supporting means is disposed in the lower clamping device.

* * * * *